Patented Nov. 9, 1937

2,098,765

UNITED STATES PATENT OFFICE 2,098,765

PROCESS OF MANUFACTURING CREAM CHEESE PRODUCTS

Caspar P. Sharpless, Swarthmore, Pa., assignor to Milk Processes, Inc., Philadelphia, Pa., a corporation of Pennsylvania No Drawing. Application January 17, 1936, Serial No. 59,602

3 Claims. (Cl. 99—116)

The present invention relates to the manufacture of soft cheese of the character of cream cheese and food products spreads of which the ingredients of cream cheese form the base. Such food stuffs will be referred to hereinafter as cream cheese. This application is a continuation in part of my co-pending application Serial No. 51,499, filed November 25, 1935, and represents a detailed improvement in the subject matter of that application. In the prior application referred to above, a process of manufacturing cream cheese is described in which acidity may be accurately controlled and loss of butter-fat avoided. These results are attained by mixing the ingredients of the cream cheese consisting of acid, milk solids, butter-fat and liquid in approximately the ratio desired in the finished cream cheese, thereby avoiding the necessity of development of additional acidity by bacterial action during the cheese-making process and the necessity of drainage of liquid and loss of butter-fat incident to such drainage.

In the manufacture of cream cheeses as conventionally practiced in this country by a process including the blending of ingredients in such a manner as to obtain a large excess of liquid above that desired in the finished cream cheese, addition of starter for development of acidity in the mixture of ingredients constituting all of those of the finished cream cheese and subsequent drainage of excess liquid, it is highly desirable that the cream or other source of butter-fat employed as an ingredient of the cream cheese be substantially neutral at the time it is blended with the other ingredients. The use of sour cream which has been neutralized, or its equivalent in this connection, is objectionable in the practice of a conventional process of the character described above for two principal reasons, as follows:

1. It is difficult, in connection with the use of neutralized cream, to obtain the desired viscosity in the mixture of ingredients, and 2. Creams which have been subjected to neutralizing treatment do not develop a sufficient degree of acidity as the result of the introduction of fresh starter to enable the operator to effect a clean break of the liquid which it is desired to drain from the curd and other ingredients desired in the finished cream cheese.

As a result of the above limitations with respect to the use of neutralized cream in the manufacture of cream cheese by the more conventional processes, cream cheese makers of this country shun the use of neutralized cream in the production of cheeses of this character. If neutralized creams could be satisfactorily used in such processes, their use would represent a very substantial saving to the manufacturer, for sour creams can be obtained at much lower prices than the fresh creams required in the preferred practice of prior art processes of cream cheese manufacture.

By the practice of the process of the present invention, neutralized sour creams may be used as the source of butter-fat to produce cream cheeses which are comparable in quality with those obtained by the use of fresh cream, thereby resulting in very substantial savings to the cheese manufacturer.

The practice of the present invention, like the practice of the invention of my co-pending application Serial No. 51,499, referred to above, involves the step of blending ingredients containing butter-fat, water, milk solids, edible casein and edible acids in approximately the ratio desired in the finished cream cheese. As the result of the blending of these products in their desired ultimate ratio, no drainage step is necessary and it is not necessary to age the cheese product after the acid is added. As a result of the avoidance of the practice of these two steps of conventional practice, neutralized sour cream may be used in place of the fresh cream used in prior art processes, for it is not necessary in my process to effect a break of the cream cheese constituents from liquid present in the products which enter into the manufacture of the cream cheese and it is not necessary that acidity be developed by bacterial action during the cheese-making process.

The present invention involves the blending of products entering into the composition of the desired cream cheese in the ratio ultimately desired, and the use, as a source of butter-fat, of neutralized sour cream, the neutralized cream preferably having a butter-fat content in excess of 65%. The invention may, for example, be practiced by blending cottage cheese with water or skim milk and a cream product containing butter-fat in excess of 65% produced by neutralizing and centrifuging sour cream. Edible acids which may be citric acid, lactic acid or a mixture thereof may also be separately added to the product in case the cottage cheese does not contain a proportion of such acids as large as that desired in the cream cheese.

The invention may also be practiced by blending enough Neufchatel style curd having a small proportion of butter-fat with the desired proportion and concentration of neutralized sour cream, aqueous liquid and/or edible acids.

In place of the cottage cheese or the Neufchatel style curd of the above two examples, a mixture of dry edible casein, edible acid and milk solids in the ratio desired may be blended with the neutralized sour cream to produce a cream cheese blend containing all of the ingredients of conventional cream cheese in the desired ratio.

In every case ingredients consisting of neutralized sour cream, preferably containing over 65% butter-fat, edible casein, edible acid and milk solids are compounded and intimately mixed together. The composition may, for example, be heated to a pasteurizing temperature and homogenized at a temperature ordinarily used for homogenizing operations of this general character, e. g., 120 to 175° F. At the conclusion of the homogenizing operation, the resulting material is packed in containers for storage, sale or shipment and cooled.

In the practice of the mixing step, a preferred form of procedure involves the performance of this mixing step in a milder manner than that involved in the performance of conventional cream homogenizing operations. Such a mild homogenizing step may, for example, constitute passage of the composition through a conventional cream homogenizer and discharge of such material from that homogenizer from a pressure between 100 and 1,000 pounds per square inch, instead of employing the higher pressures ordinarily used in cream homogenization. Alternatively, the mixing operation may be attained by passage of the compounded materials through a conventional colloid mill.

In any case, the compounded materials contain substantially no liquid in excess of that desired in the ultimate cream cheese and the step of drainage of liquid from the other ingredients of the composition after the mixing operation is accordingly avoided. In view of this avoidance of the draining operation, the objectionable aspects of the use of neutralized sour cream in prior art cream cheese making operations are avoided. After the composition has been subjected to the desired mixing operation, it may be packed in containers and cooled. After such cooling it has a smooth creamy texture and an excellent flavor.

Modifications will be obvious to those skilled in the art and I do not therefore wish to be limited except by the scope of my sub-joined claims.

I claim:

1. A process of manufacturing a cream cheese which comprises intimately mixing materials comprising neutralized sour cream with cottage cheese and edible acid in substantially the ratio desired in said finished cream cheese, and cooling the composition resulting from the mixing operation.

2. A process of manufacturing a cream cheese which comprises intimately mixing materials comprising neutralized sour cream with dry edible casein and edible acid, milk solids in substantially the ratio desired in the finished cream cheese, and cooling the composition resulting from the mixing operation.

3. A process of manufacturing a cream cheese which comprises intimately mixing materials comprising neutralized sour cream in excess of 65% butter fat with dry edible casein, edible acid and milk solids in substantially the ratio desired in the finished cream cheese, and cooling the composition resulting from the mixing operation.

CASPAR P. SHARPLESS.